United States Patent [19]

Tward

[11] 4,432,238
[45] Feb. 21, 1984

[54] CAPACITIVE PRESSURE TRANSDUCER

[75] Inventor: Emanuel Tward, Northridge, Calif.

[73] Assignee: Tward 2001 Limited, Los Angeles, Calif.

[21] Appl. No.: 400,754

[22] Filed: Jul. 22, 1982

[51] Int. Cl.³ .............................................. G01L 9/12
[52] U.S. Cl. ...................................... 73/724; 361/283
[58] Field of Search ..................... 73/724, 718, 304 C; 361/283, 284

[56] References Cited

U.S. PATENT DOCUMENTS 4,169,389 10/1979 Yasuhara et al. ...................... 73/718

Primary Examiner—Donald O. Woodiel
Attorney, Agent, or Firm—Philip D. Junkins

[57] ABSTRACT

A capacitive type pressure sensing transducer comprised of a housing having a pressure sensitive element which interfaces with an applied pressure force to be sensed and measured and which moves in response to force changes to vary the volume of the housing in direct relation to such changes. The housing is filled with a fluid which is in fluid flow communication with a multi-capacitor fluid level sensor. The sensor is formed of a first pair of plate type capacitors of like fixed capacitive value and a second pair of plate type capacitors having like open dielectric spaces for receiving varying levels of fluid from the transducer housing in response to changes in the volume of the housing. Thus, a change in pressure applied to the pressure sensitive element of the transducer produces a corresponding change in the fluid level within the dielectric spaces of the second pair of capacitors of the sensor and a corresponding change in the capacitance value of such capacitors. The capacitors of the sensor are electrically connected into a classic alternating current Wheatstone bridge circuit and the current flow value of the circuit is measured as a direct, linearly-related value of the pressure force applied to the transducer.

9 Claims, 3 Drawing Figures

CAPACITIVE PRESSURE TRANSDUCER

BACKGROUND OF THE INVENTION

1. Field of the Invention

This invention relates to pressure sensing transducers and more particularly to capacitive type pressure sensing transducers.

2. Description of the Prior art

Many forms of pressure sensing transducers utilizing capacitive sensors have been disclosed in the prior art. Most variable capacitive sensors have a deformable metallic member such as a diaphragm, bellows or beam which forms one plate of a plate type capacitor and can be moved relative to a base structure by the actuating pressure. An electrode member rigidly connected to, but electrically insulated from, the base and in close proximity to the deformable member forms the other plate of the variable capacitive sensor. Conventional capacitance sensors of this type have several significant disadvantages. Proper alignment of the sensor components is very difficult to achieve. Since reasonable values of capacitance and high relative change of capacitance with plate movement require very small gap dimensions, typically on the order of 0.001 inches, proper control of parallelism and gap dimensions is extremely important. To achieve proper alignment of the capacitor plates, very precise and small tolerances must be placed upon the component parts.

The possibilities for degradation of performance by thermal shift in structural alignment is difficult to avoid with a typical capacitive type transducer having long thermal paths in the structure determining the relative portions and alignment of the capacitance plates. The thermal problems include both the changes induced by different ambient temperatures and the transient effects produced when a temperature change occurs. These problems are further complicated by the fact that structure requirements for particular portions, such as the elastic properties of the diaphragm material, make it difficult to choose materials such that there may be a cancellation of the effects caused by thermal expansion. A further disadvantage of existing structures is that mounting stresses, which frequently occur when the structure is affixed to the system being measured, cause distortions in one or both of the capacitance plate and support structures. Such distortions can cause a shift in the initial value of the capacitive sensor and/or a change in the rate at which capacitance changes with applied force.

Capacitive pressure sensing transducers have also been constructed of ceramic, quartz or other dielectric materials to form chambers or walls with conductive films on their interior surfaces. U.S. Pat. Nos. 3,715,638 and 3,858,097 granted to W. R. Polye are illustrative of such constructions. The operative portions of these prior art constructions are substantially flat and of substantially uniform thickness. With chambers or capsules having walls of uniform thickness there is a stress concentration in the peripheral region where the walls are fused together and the deflection of the conductive surfaces of the transducer varies with the radial position of the deflection portion. In U.S. Pat. No. 4,168,518 granted to S. Y. Lee there is disclosed a capacitive pressure transducer structure in which deflection and maximum stress is controlled by the elastic properties and strength of the dielectric material carrying the capacitive plates rather than by the properties of a fusing or cementing material.

As previously related, prior art capacitive type pressure or force sensing transducers have been found to be sensitive to temperature change. They also have high impedance output and frequently require complex external electronic circuitry. The typical capacitive type transducers utilize a single plate type capacitor system and must be reactively as well as resistively balanced with external capacitive bridge circuitry. Long lead lengths and moving leads allow stray capacitive impedance pickup and thus introduce extraneous impedance variations to the detection, measurement and pressure or force value indication circuitry. It is often necessary to have a preamplifier close to the transducer.

SUMMARY OF THE INVENTION

The present invention relates to a capacitive type pressure sensing transducer comprised of a housing member bearing as one of its walls a pressure sensitive element which interfaces with an applied variable pressure force to be sensed and measured and which moves in response to force changes to vary the volume of the housing in direct relation to such changes. The housing member is filled with an incompressible fluid which is in fluid flow communication with a multi-capacitor fluid level sensor. The sensor is formed of a first pair of plate type capacitors of fixed and substantially like capacitive value and a second pair of plate type capacitors having like open dielectric spaces for receiving varying levels of fluid from the housing in response to changes in the volume of the housing in direction relation to pressure changes moving the pressure sensitive element. Thus, a change in pressure applied to the pressure sensitive element of the transducer structure produces a corresponding change in the capacitance value of the pair of capacitors having open dielectric spaces within which the level of the incompressible fluid from the housing member rises or falls. The present invention overcomes the deficiencies of prior art capacitive type pressure sensing transducers by uniquely combining the four capacitances of the fluid level sensor component of the transducer into classic Wheatstone bridge circuitry including an alternating current generator and current flow detection, measurement and value indicating circuitry.

It is an object of the present invention to provide an improved capacitive type pressure transducer of multi-capacitor design that is insensitive in its accuracy of pressure measurement to changes in the environmental characteristics to which it is exposed.

It is another object of the present invention to provide an improved capacitive type pressure transducer of multi-capacitor design which can be readily incorporated in classic Wheatstone bridge circuitry and which is insensitive in its accuracy of measurement to environmental changes or to stray capacitance.

It is a further object of the present invention to provide an improved capacitive pressure transducer including a housing bearing a pressure sensitive element which varies the volume of the housing in direct relationship with applied pressure and fluid within the housing is thereby expressed to or withdrawn from the open dielectric spaces of capacitors of an associated fluid level sensor to vary the capacitance value of such capacitors in direct relationship with the applied pressure.

These and other objects of the invention will become apparent to those skilled in the art upon consideration of the accompanying specification, claims and drawing.

BRIEF DESCRIPTION OF THE DRAWING

Referring to the drawing, wherein like characters indicate like parts throughout the figures.

DESCRIPTION OF THE PREFERRED EMBODIMENT

The present invention is intended as an improvement on conventional capacitive pressure sensing transducers. The transducer of the invention incorporates a uniquely configured fluid level sensor component comprised of four plate type capacitors extending in clustered parallel alignment throughout the length of the sensor. The four capacitors are constructed from four electrically conductive capacitor elements each comprised of two electrically connected capacitive plates. The capacitor elements are mounted in fixed spaced relationship from one another and positioned by mounting means so that each plate of each capacitor element defines with a plate of the next adjacent capacitor element a dielectric space therebetween whereby the mounted capacitor elements together form four dielectric spaces. Material of constant dielectric value fills two of the dielectric spaces thereby forming with the respective space defining plates a pair of capacitors of fixed capacitive value. The other two dielectric spaces remain open to receive variable quantities of the fluid to be sensed and the plates defining such spaces with the variable quantities of fluid therein cooperate to form a pair of capacitors of variable capacitance value.

The unique structure of the capacitive fluid level sensor component of the transducer, as described in detail hereinafter, permits the pair of fixed value capacitors (having like capacitive value) and the pair of variable value capacitors to be directly utilized as the four capacitive legs or sides of a classic alternating current Wheatstone bridge circuit having an alternating current generator (constant voltage at set frequency) and associated current detection, measurement and value indicating circuitry. The bridge circuitry, comprised of the two fixed value capacitors and two variable value capacitors forming the sensor, is arranged to be in an unbalanced state (current flowing through the detection circuit) so long as any fluid level is maintained within the open dielectric spaces between the plates of the variable value capacitors. With the bridge structured and operating in this fashion the detector circuitry reads the bridge unbalance (value of current flow) linearly as a direct measurement of fluid level in the sensor, such level being determined by the value of pressure force acting on the pressure sensitive element to displace the same with the resultant directly related expression or withdrawal of the housing fluid to or from the sensor.

Because all capacitors of the bridge circuit are part of and comprise the multi-capacitor sensor component of the transducer, the bridge circuit is insensitive to stray capacitance and such bridge circuit capacitor components are all subjected to like environmental conditions.

Figure 1:
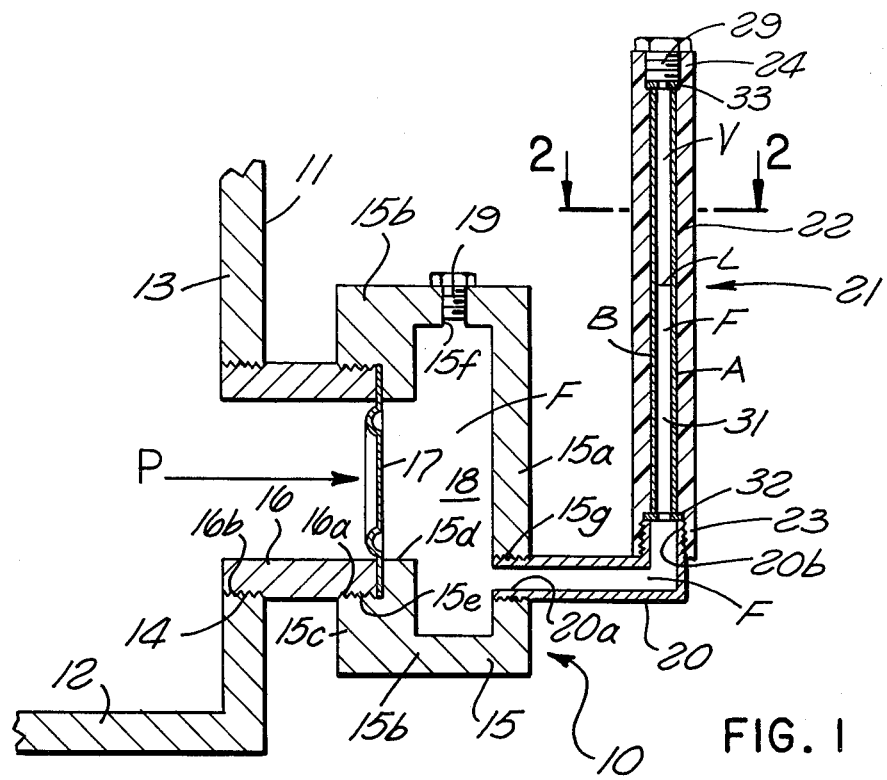
FIG. 1 is an elevation view in cross-section of the capacitive type pressure transducer of the present invention with the fluid level sensor of such transducer shown in a cross-section taken at line 3—3 of FIG. 2.

Referring now to the drawing, a multi-capacitor pressure sensing transducer 10, in accordance with the invention, is illustrated in longitudinal cross-section in FIG. 1 in installed position in a vessel 11. As shown, the transducer 10 is mounted adjacent the bottom wall 12 of the vessel in the sidewall 13 thereof through a threaded orifice 14 so that the device is subject to pressure force P created by the material within the vessel (liquid, vapor or gas). The transducer housing 15 is comprised of side wall 15a, annular wall 15b and side wall 15c which is provided with annular port 15d. A cylindrical conduit 16 is threaded, at its end portion 16a, to housing 15 in a threaded portion 15e surrounding port 15d. The conduit 16 is threaded, at its opposite end portion 16b, to orifice 14 of vessel 11 to support the transducer 10 in its operative pressure measuring position. A pressure sensitive element 17 (such as a metallic diaphragm or bellows) is positioned across housing port 15d and is maintained thereat by the threading of end portion 16a of conduit 16 into the threaded portion 15c of the housing surrounding port 15d. Thus, a fluid tight relationship is maintained by element 17 between the medium (liquid, vapor or gas) within vessel 11 and a fluid F within chamber 18 defined by the walls of housing 15 and pressure sensitive element 17. A threaded orifice 15f is provided in annular wall 15b of the housing 15 through which fluid F may be introduced to the transducer during its installation and calibration. After filling chamber 18 with fluid the orifice 15f is sealed off by threaded plug 19.

Figure 2:
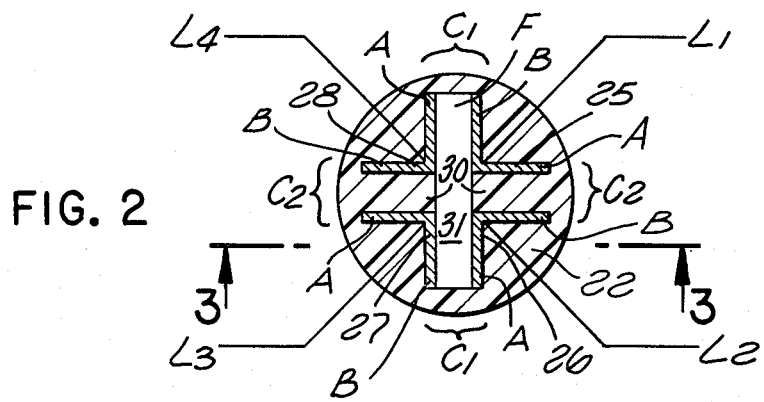
FIG. 2 is a cross-section of the fluid level sensor component of the transducer of FIG. 1 taken at line 2—2 of FIG. 1.

Side wall 15a of transducer housing 15 is provided with a port 15g in which pipe 20 is threaded at its end portion 20a. Pipe 20, in its other end portion 20b, is threaded to and supports the fluid level sensor component 21 of the transducer. As shown in FIGS. 1 and 2. Fluid level sensor 21 is comprised of an elongated non-conducting cylindrical body element 22 providing at its lower portion 23 thread means for mounting the sensor component 21 to pipe 20. The upper portion 24 of the body element 22 is also threaded to receive a closure cap 29. Internally, the fluid level sensor 21 is comprised of four electrically conductive capacitor elements 25, 26 27 and 28 each comprised of two capacitive plates "A" and "B". The body element 22 is designed (as shown in FIG. 2) to mount the capacitor elements in fixed spaced relationship from one another and for positioning such element so that each plate thereof defines with a plate of the next adjacent capacitor element a dielectric space therebetween whereby the four mounted capacitor elements together form four dielectric spaces. As shown in FIG. 2 the non-conductive body element 22 has portions 30 which extend between plate A of element 25 and plate B of element 26 and between plate A of element 27 and plate B of element 28 to fill the dielectric spaces between these pairs of plates. Thus, non-conducting portions 30 of body element 22, comprised of dielectric material, form with conductive plate A of element 25 and conductive plate B of element 26 and with conductive plate A of element 27 and conductive plate B of element 28 two plate type capacitors $C_2$ of like fixed capacitance (impedance value). The dielectric space 31 defined (respectively) by plate A of element 26 and plate B of element 27 and by plate A of element 28 and plate B of element 25, remains open and free and at its lower end communicates with pipe 20 to receive variable quantities and levels of fluid F from chamber 18 to be sensed. Thus, the variable fluid quantity within space 31 forms with conductive plate A of element 26 and conductive plate B of element 27 and with conductive plate A of conductive element 28 and plate B of conductive element 25 two plate type capacitors $C_1$ of variable capacitance (impedance value).

Threaded cap 29 of the sensor body 22 is removed during the filling of chamber 18 with fluid F. After such filling operation and the threading of cap 19 into transducer housing 15 the fluid (F) in sensor space 31 reaches a level paralleling the level of fluid in chamber 18. Additional fluid (F) is introduced to space 31 to fill such space before threading cap 29 into sensor body 22. With cap 29 in place in the sensor body cap 19 is removed and a small amount fluid (F) overflows chamber 18 as the head of fluid in sensor space 31 drops to a level L with the creation of a vacuum V is space 31 above fluid level L. The cap 19 is thereafter reapplied to housing 15. With the sensor space 31 experiencing only varying levels of fluid (F) and vacuum during the operation of the transducer assembly of the invention, the like capacitance values of the variable capacitors $C_1$ are directly related to the level of fluid F in space 31 as determined by movement of pressure sensitive element 17 in response to applied pressure P. Preferably, the fluid F is a non-conducting incompressible liquid having a relatively high vaporization temperature. A conducting liquid may be utilized as the fill fluid (F) provided the capacitor elements are appropriately coated with a non-conducting protective film.

Figure 3:
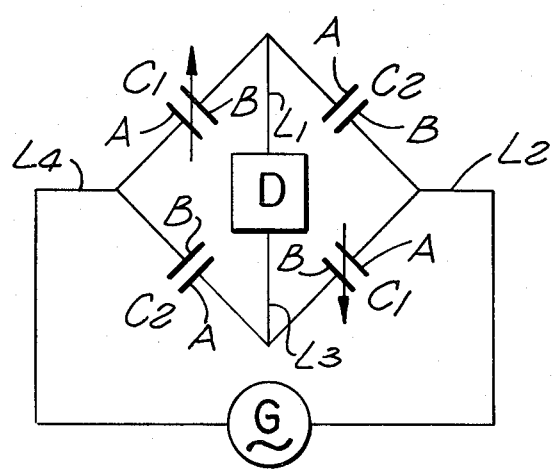
FIG. 3 is a schematic block diagram of circuitry in which the capacitors of the fluid level sensor component of the transducer of FIGS. 1 and 2 are clearly identified in a classic Wheatstone bridge circuit configuration.

The cluster of capacitor elements 25, 26 27 and 28 within non-conducting body element 22 of sensor 21 is insulated from pipe 20 by an annular non-conductive spacer 32 and from cap 29 by a like annular non-conductive space 33. Electrically conductive lead wires L1, L2, L3 and L4 are connected, respectively, to capacitor elements 25, 26, 27 and 28 (see FIG. 2) and leave the sensor 21 via insulated passage therefrom. When these lead wires are further connected to alternating current generator circuitry "G" and current detection, measurement and value indicating circuitry "D", as shown in FIG. 3, there results simple bridge circuitry of classic Wheatstone configuration. Because all four capacitors of the bridge circuit are clustered together within the fluid level sensor component 21 of the pressure transducer 10, the circuitry is not (as previously mentioned) subject to stray capacitance and long leads may be used to connect the transducer to the current generator circuitry G and/or the current detector, measurement and value indicating circuitry D.

The pressure sensing transducer of FIG. 1 of this invention is particularly applicable to a pressure measurement situation involving the measurement of monitoring of a single pressure medium. Thus, the application of pressure through conduit 16 to pressure sensitive element 17 causes such element to deflect within chamber 18 reducing its volume and express fluid F through pipe 20 to increase the level of fluid within dielectric space 31 of sensor 21. This results in a change in the capcitance value which variable capacitors $C_1$ display with respect to the bridge circuitry. Since the deflection of pressure sensitive element 17 takes place almost solely in its outer peripheral region, rather than within its central region, the volume of chamber 18 within the transducer housing is decreased in substantially direct linear relationship to the applied pressure force and the resultant change in the level of fluid F in fluid level sensor 21 results in a direct linear relationship between such applied pressure force and the value of current flow in the Wheatstone bridge circuit.

Before the application of any pressure P to the transducer of this invention the applied alternating current is varied as to its frequency and/or voltage and/or the detector circuitry (including its measuring and/or pressure value indicating instrumentation) is adjusted in known manner to obtain the appropriate sensitivity required for measuring pressure values when applied to the transducer. For the bridge circuit of FIG. 3 the respective capacitors may have impedance values as indicated below.

Fixed value capacitors
  $C_2$ impedance = $Z_2$
Variable value capacitors
  $C_1$ impedance = $Z_1$ The detector circuitry D also presents an impedance value which may be designated as $Z_3$. The alternating current generator circuitry, at set frequency, has a constant voltage "e" which is applied across the bridge. Thus, If $Z_3$ is of small value, i.e., $Z_3 < Z_1$ and $Z_2$ then it can be established that the current "i" through the detector circuitry is:

$$i = (e\omega \div 2)(C_1 - C_2)$$

where
  e is the voltage value and
  $\omega = 2\pi \times$ frequency

The current value i in the detector circuitry changes in linear relation to changes in the capacitance value of capacitors $C_1$. Therefore, changes in the $C_1 - C_2$ relationship may be determined by measuring changes in the current value i. Furthermore, with appropriate detector and a.c. generator circuitry (e.g. by keeping the current i constant and varying the $\omega$ value) the readout of the $C_1 - C_2$ value can be effected by measuring the period of the angular frequency $\omega$. Thus, the readout instrumentation in the detector circuitry may yield digital values of pressure in direct linear relationship to the changes in capacitances $C_1$ (for small changes in $C_1$).

From the foregoing, it will be appreciated that the bridge circuitry, comprised of the two like and substantially fixed value capacitors and the two like variable value capacitors, is arranged to be in an unbalanced state (current flowing through the detection circuit) at all instances when pressure is applied to the transducer and the dielectric value of space 31 varies from its normal value. With the bridge circuitry structured and operating in this fashion the detector circuitry reads the bridge unbalance (value of current flow) linearly as a direct measurement of capacitance value difference and the detector circuitry with associated measurement and value indicating circuitry will report or display such difference or may be modified by well known circuitry means to report or display the actual (changing) capacitance of space 31 or the actual (changing) pressure value applied to the pressure sensitive element 17.

Typically, for the foregoing embodiment of the invention, the pressure sensitive element 17 is fabricated as a diaphragm or bellows of metal with good elastic and chemical properties such as heat-treatable stainless steel. The sensor body 22 and dielectric element 30 may be made of dielectric material such as ceramic, glass, quartz or plastic. The sensor embodiment shown in FIGS. 1 and 2 and described heretofore provides that the dielectric sensor space 31 is closed to atmosphere and that a vacuum is developed above the fluid level within such space. In fact, the open space above the fluid in dielectric space 31 may be in communication with atmosphere so that the current measurement made by the detector circuitry and the pressure value indicated by such circuitry are directly related the differential pressure value between pressure force P applied to the pressure sensitive element 17 of the transducer of the invention and atmosphere pressure.

While certain preferred embodiments have been described above, it will be apparent to those skilled in the art that modifications may be made for specific applications without departing from the spirit and scope of the novel concept of this invention. Thus, a pressure measuring instrument may be the ultimate form of the invention, or the novel transducer may be part of an operating system wherein the change in capacitance (related to the application of pressure) is used to control a parameter which will affect system performance and the pressure being measured. Therefore, it is intended by the appended claims to cover all such modifications and variations which fall within the true spirit and scope of the invention.

What is claimed is:

1. A capacitive type pressure sensing transducer assembly comprising:
   (a) a transducer housing with walls defining a fluid chamber and incompressible fluid within and filling said chamber;
   (b) a pressure sensitive element spanning a port in one wall of said housing, said element interfacing with an applied pressure force to be sensed and measured and being deflectable in response to said pressure force to vary the volume of the fluid chamber of said transducer housing;
   (c) a multi-capacitor fluid level sensor formed of a first pair of plate type capacitors having like fixed electrical capacitive value and a second pair of plate type capacitors having like open dielectric spaces in fluid flow communication with the fluid chamber of said housing within which fluid from said chamber is maintained as like variable height fluid columns of dielectric material whereby the electrical capacitive value of said second pair of capacitors varies directly with the increasing or decreasing volume of said fluid chamber and corresponding decreasing or increasing height of said fluid columns in response to a pressure force applied to said pressure sensitive element;
   (d) means electrically connecting the first and second pairs of capacitors of said sensor together to form the four capacitive sides of a Wheatstone bridge circuit, the first pair of capacitors connected as two opposing sides of said bridge and the second pair of capacitors connected as the remaining two opposing sides of said bridge;
   (e) a source of alternating current of constant voltage and set frequency connected across said bridge circuit to a first set of terminals at opposite corners of the bridge, each of said terminals located between a capacitor of the first pair of capacitors and a capacitor of the second pair of capacitors of said sensor; and
   (f) a current detection circuit connected across the bridge to a second set of terminals independent of said first set of terminals and at opposite corners of the bridge, each of said second terminals located between a capacitor of the first pair of capacitors and a capacitor of the second pair of capacitors of said sensor, said detection circuit including current value measuring and current value indication circuitry for expressing in direct relationship said current value as a pressure force value.

2. A capacitive type pressure sensing transducer assembly as defined in claim 1 wherein the first and second pairs of capacitors forming the multi-capacitor fluid level sensor of said transducer assembly are coated with an insulating film and the incompressible fluid filling the fluid chamber of the transducer housing and forming the variable fluid columns within the like open dielectric spaces of said second pair of capacitors is an electrically conducting liquid.

3. A capacitive type pressure sensing transducer assembly as defined in claim 1 wherein the pressure sensitive element spanning the port in one wall of the transducer housing is a metallic diaphragm.

4. A capacitive type pressure sensing transducer assembly as defined in claim 1 wherein the pressure sensitive element spanning the port in one wall of the transducer housing is a metallic bellows.

5. A capacitive type pressure sensing transducer assembly comprising:
   (a) a transducer housing with walls defining a fluid chamber and incompressible fluid within and filling said chamber;
   (b) a pressure sensitive element spanning a port in one wall of said housing, said element interfacing with an applied pressure force to be sensed and measured and being deflectable in response to said pressure force to vary the volume of the fluid chamber of said transducer housing;
   (c) four electrically conductive capacitor elements each formed to present two electrically conductive capacitive plates;
   (d) means for mounting said capacitor elements in fixed spaced relationship from one another and for positioning said elements so that each capacitive plate thereof defines with a capacitive plate of the next adjacent capacitor element a dielectric space therebetween whereby said mounted capacitor elements with their respective plates together form a sensor having four plate type capacitors;
   (e) dielectric material within the dielectric spaces of a first pair of the capacitors of said sensor whereby said pair of capacitors have like fixed electrical capacitive value;
   (f) means connecting the dielectric spaces of a second pair of the capacitors of said sensor in fluid flow communication with the fluid chamber of said housing so that fluid from said chamber is maintained as like variable height fluid columns of dielectric material within said spaces whereby the electrical capacitive value of said second pair of capacitors varies directly with the increasing or decreasing volume of said fluid chamber and corresponding decreasing or increasing height of said fluid columns in response to a pressure force applied to said pressure sensitive element;
   (g) means electrically connecting the first and second pairs of capacitors of said sensor together to form the four capacitor sides of a Wheatstone bridge circuit, the first pair of capacitors connected as two opposing sides of said bridge and the second pair of capacitors connected as the remaining two opposing sides of said bridge;

(h) a source of alternating current of constant voltage and set frequency connected across said bridge circuit to a first set of terminals at opposite corners of the bridge, each of said terminals located between a capacitor of the first pair of capacitors and a capacitor of the second pair of capacitors of said sensor; and (i) a current detection circuit connected across the bridge to a second set of terminals independent of said first set of terminals and at opposite corners of the bridge, each of said second terminals located between a capacitor of the first pair of capacitors and a capacitor of the second pair of capacitors of said sensor, said detection circuit including current value measuring and current value indication circuitry for expressing in direct relationship said current value as a pressure force value.

6. A capacitive type pressure sensing transducer assembly as defined in claim 5 wherein the pressure sensitive element spanning the port in one wall of the transducer housing is a metallic diaphragm.

7. A capacitive type pressure sensing transducer assembly as defined in claim 5 wherein the pressure sensitive element spanning the port in one wall of the transducer housing is a metallic bellows.

8. A capacitive type pressure sensing transducer assembly as defined in claim 5 wherein the dielectric spaces of the second pair of capacitors of the sensor which contain variable height fluid columns are closed to atmosphere above said fluid columns and a vacuum is maintained within the space above said fluid columns.

9. A capacitive type pressure sensing transducer assembly as defined in claim 5 wherein the dielectric spaces of the second pair of capacitors of the sensor which contain variable height fluid columns are open to atmosphere above said fluid columns.

* * * * *